US012786366B2

(12) United States Patent
Xin et al.

(10) Patent No.: US 12,786,366 B2
(45) Date of Patent: Nov. 3, 2026

(54) FAST ADAPTATION FOR CROSS-CAMERA COLOR CONSTANCY

(71) Applicant: Black Sesame Technologies (Shanghai) Co., Ltd., Shanghai (CN)

(72) Inventors: Zhaowei Xin, Shanghai (CN); Chao Wang, Shanghai (CN); Donghui Wu, San Mateo, CA (US)

(73) Assignee: BLACK SESAME TECHNOLOGIES (SHANGHAI) CO., LTD., Shanghai (CN)

( * ) Notice: Subject to any disclaimer, the term of this patent is extended or adjusted under 35 U.S.C. 154(b) by 274 days.

(21) Appl. No.: 18/609,856

(22) Filed: Mar. 19, 2024

(65) Prior Publication Data

US 2025/0274572 A1 Aug. 28, 2025

(30) Foreign Application Priority Data

Feb. 28, 2024 (CN) ......................... 202410224270.4

(51) Int. Cl.
*H04N 9/73* (2023.01)
*G06T 5/40* (2006.01)
*G06T 5/60* (2024.01)

(52) U.S. Cl.
CPC ................. *H04N 9/73* (2013.01); *G06T 5/40* (2013.01); *G06T 5/60* (2024.01); *G06T 2207/10024* (2013.01); *G06T 2207/20081* (2013.01)

(58) Field of Classification Search
USPC .......................................................... 382/100
See application file for complete search history.

(56) References Cited

U.S. PATENT DOCUMENTS

2021/0006760 A1* 1/2021 Mcdonagh ............... G06N 3/08
2021/0250565 A1* 8/2021 Caron .................... G06V 40/16
2023/0113349 A1* 4/2023 Caron .................... G06V 20/00 348/223.1

* cited by examiner

*Primary Examiner* — Jacky X Zheng
(74) *Attorney, Agent, or Firm* — Shun Yao; Yao Legal Services, Inc.

(57) ABSTRACT

Embodiments of this disclosure can provide a system and method for white balancing images. During operation, the system can obtain labeled red, green, and blue (RGB) image samples captured by a plurality of cameras and generate a plurality of training tasks. A respective training task is associated with RGB image samples captured by a corresponding camera. The system can perform meta-training over the plurality of training tasks to obtain a meta model, with parameters of the meta model optimized based on a global loss function. The system can obtain an image captured by a first camera, fine-tune the meta model using labeled RGB image samples captured by the first camera to obtain a fine-tuned model specific to the first camera, and implement the fine-tuned model to white balance the image.

14 Claims, 6 Drawing Sheets

FAST ADAPTATION FOR CROSS-CAMERA COLOR CONSTANCY

RELATED APPLICATION

This application claims the benefit under 35 U.S.C. § 119 (a) of the filing date of Chinese Patent Application No. 202410224270.4, filed in the Chinese Patent Office on Feb. 28, 2024. The disclosure of the foregoing application is herein incorporated by reference in its entirety.

BACKGROUND

Field

The disclosed embodiments generally relate to color constancy in image processing. More specifically, the disclosed embodiments relate to machine learning-based cross-camera color constancy.

Related Art

Color constancy in image processing refers to the challenge of ensuring that the colors of objects in images appear consistent and accurate, regardless of the lighting conditions in which the images were captured. Computational color constancy can also be referred to as automatic white balancing and can be used to remove the color bias of raw images captured by digital cameras. Color constancy is essential for computer vision applications, as it can facilitate recognizing and analyzing objects in images without being influenced by variations in illumination.

There have been many different approaches to solving the color constancy problem. One simple approach is known as the "gray world" algorithm, which assumes that the illuminant color is the average color of all image pixels, thereby assuming that object reflectance (i.e., the color of the paint of the surfaces in the scene) is gray on average. Such a simple idea can also be generalized to other statistical models that assume some distribution of colors. Among the various approaches, machine learning techniques such as deep neural networks have been used to improve the accuracy of color constancy.

Learning-based color constancy approaches aim to learn a complex non-linear mapping function between the input image and the illumination. Existing approaches typically involve training a neural network using images captured by the same camera to learn the image-illumination mapping and cannot solve the cross-camera color constancy problem. Because different image sensors (i.e., cameras) have different spectral sensitivities, the image-illumination mapping can be different for different image sensors. Training a model (e.g., a deep neural network) to learn the image-illumination mappings across multiple image sensors can require a large amount of labeled data from different image sensors, and acquiring such data can be challenging. Moreover, transferring a learned model between different image sensors can be a complex and cumbersome process.

SUMMARY

Embodiments of this disclosure can provide a system and method for white balancing images. During operation, the system can obtain labeled red, green, and blue (RGB) image samples captured by a plurality of cameras and generate a plurality of training tasks. A respective training task is associated with RGB image samples captured by a corresponding camera. The system can perform meta-training over the plurality of training tasks to obtain a meta model, with parameters of the meta model optimized based on a global loss function. The system can obtain an image captured by a first camera, fine-tune the meta model using labeled RGB image samples captured by the first camera to obtain a fine-tuned model specific to the first camera, and implement the fine-tuned model to white balance the image.

In a variation on this embodiment, the system can extract features from each RGB image sample by computing a two-dimensional (2D) log-chrominance histogram.

In a further variation, computing the 2D log-chrominance histogram can include computing chrominance components of each pixel in the RGB image sample based on RGB values of the pixel.

In a variation on this embodiment, the respective training task comprises a regression task based on a camera-specific loss function.

In a further variation, each image sample can be labeled with ground truth illumination, and the camera-specific loss function measures angular loss between the ground truth illumination and estimated illumination.

In a variation on this embodiment, the first camera can include a new camera not belonging to the plurality of cameras.

In a variation on this embodiment, performing the meta-training can include batch training, and a respective batch can include multiple randomly selected training tasks.

DESCRIPTION OF THE FIGURES

In the figures, like reference numerals refer to the same figure elements.

DETAILED DESCRIPTION

Figure 1:
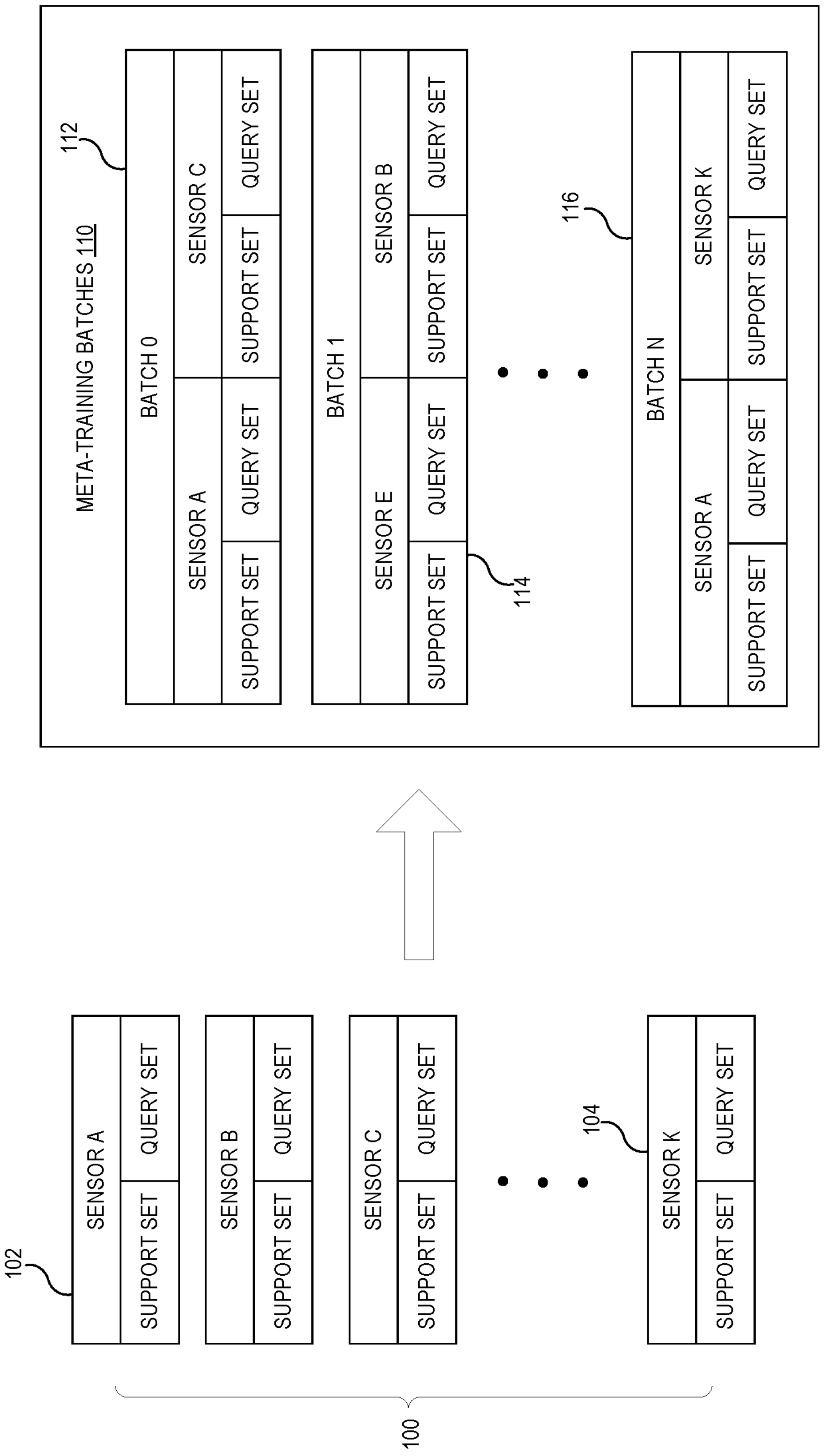
FIG. 1 illustrates an exemplary scenario of generating meta-training batches from training samples of individual image sensors, according to one embodiment of the instant application.

The following description is presented to enable any person skilled in the art to make and use the disclosed embodiments and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Overview

Embodiments of this disclosure provide a system and method for achieving cross-camera color constancy. More specifically, a model-agnostic meta-learning (MAML) method can be used to train a neural network using labeled training data from different image sensors. The training process can include a meta-training phase and a fine-tuning phase. During meta-training, a plurality of batches of training tasks can be generated, with each batch comprising training tasks associated with multiple (e.g., two) image sensors. Each training task can include a regression task to learn a non-linear mapping between RGB images captured by a particular camera and the corresponding illumination. A meta model can be trained based on a global loss function, which can be the summation of the domain-specific loss functions of multiple domains. The meta model can be fine-tuned based on a particular image sensor by performing training using labeled samples from that particular sensor.

The Feature Extraction

In this disclosure, an image captured by a camera can be denoted I, with I(x, y) representing the red, green, and blue (RGB) pixel value in spatial position (x, y). I(x, y) is a function of the spectral power distribution of illumination ($L_{x,y}(\lambda)$), the spectral sensitive function of image sensor ($C_{x,y}(\lambda)$), and the spectral reflectance of the point ($R_{x,y}(\lambda)$), as indicated by Equation (1):

$$I(x, y) = \int_{\lambda} L_{x,y}(\lambda) C_{x,y}(\lambda) R_{x,y}(\lambda) d\lambda. \quad (1)$$

Note that the spectral sensitivity of an image sensor can be different for different wavelengths. Moreover, Equation (1) indicates that the raw image data (i.e., the pixel values) of the same object captured by different cameras or under different illumination conditions can exhibit different distributions. In other words, for the same $R_{x,y}(\lambda)$, different $C_{x,y}(\lambda)$ or different $L_{x,y}(\lambda)$ can result in a different I(x, y). The goal of computational color constancy is to remove the effect of $L_{x,y}(\lambda)$ on I(x, y) to mimic the human color perception system which ensures that the color of an object remains constant under varying illumination conditions.

According to a simplified model of image formation, the pixel values (denoted I) of the image can also be expressed as the product of the "true" white-balanced RGB values (denoted W) and the illumination values (denoted L):

$$\begin{bmatrix} I_r \\ I_g \\ I_b \end{bmatrix} = \begin{bmatrix} L_r & 0 & 0 \\ 0 & L_g & 0 \\ 0 & 0 & L_b \end{bmatrix} \begin{bmatrix} W_r \\ W_g \\ W_b \end{bmatrix}. \quad (2)$$

The goal of solving the color constancy problem is to recover W from I by estimating L and then compute W=I/L. In some embodiments, one can define the two measures of chrominance u and v from the RGB values of I and W according to:

$$I_u = \log(I_g/I_r) \quad I_v = \log(I_g/I_b) \quad (3)$$
$$W_u = \log(W_g/W_r) \quad W_v = \log(W_g/W_b)$$

In alternative embodiments, the two measures of chrominance u and v can be defined according to:

$$I_u = \log\left(\frac{I_b \cdot I_r}{2I_g}\right) \quad I_v = \log\left(\frac{I_b}{I_r}\right) \quad (4)$$

One can also define a luminance measure y for I as $$I_y = \sqrt{I_r^2 + I_b^2 + I_g^2}.$$

Given that the absolute scaling of W does not matter, the problem of estimating L can be further simplified to just estimating the chrominance of L, which can be represented as:

$$L_u = \log(L_g/L_r) \quad L_v = \log(L_g/L_b). \quad (5)$$

The problem formulation can be rewritten in the log-chrominance space as:

$$W_u = I_u - L_u \quad W_v = I_v - L_v. \quad (6)$$

Therefore, the color constancy problem can be reduced to recovering two quantities: ($L_u$, $L_v$). To train a machine learning model (e.g., a neural network) to learn ($L_u$, Ly) from captured images, one should first extract meaningful features from the input images and use the extracted features as training samples. Note that, although it is possible to treat an entire image as a training sample, such an approach can be computationally more expensive. In some embodiments, features representing an image can include a two-dimensional (2D) log-chrominance histogram of the image.

Considering an input image/and its ground truth illumination L, one can construct a 2D histogram H(u, v) based on the log-chrominance of the image, where H(u, v) is the number of pixels in I whose chrominance is near (u, v). In one example, H(u, v) can be expressed as:

$$H(u, v) = \sum_i \left[ \left( \left| I_u^i - u \right| \le \eta/2 \right) \cap \left( \left| I_v^i - v \right| \le \eta/2 \right) \right], \quad (7)$$

where $I_u^i$ and $I_v^i$ are u and v values of pixel i, η is the bin width of the u-v component. In this example, the histogram counts are not weighted. In alternative embodiments, the histogram counts can also be weighted by each pixel's luminance. For example, H(u, v) can also be expressed as:

$$H(u, v) = \sum_i I_y^i \left[ \left( \left| I_u^i - u \right| \le \eta/2 \right) \cap \left( \left| I_v^i - v \right| \le \eta/2 \right) \right], \quad (8)$$

where $$I_y^i$$

is the luminance at the $i_{th}$ pixel. According to some embodiments, collecting training samples can include computing a 2D histogram for each image. The training samples are labeled with the ground truth illumination.

The Model Training

In the context of machine learning, given a set of input X (from a feature space x, e.g., $X=\{x_1, \ldots, x_n\} \in \chi$) and their corresponding labels Y, a domain D) is defined by X and the marginal probability distribution P(X), and a task T is defined by Y and the conditional probability distribution P(Y|X). Because different cameras have different spectral sensitivities, the domains for the different cameras can be distinct from each other. Moreover, the measured ground truth illumination of the same scene captured by different cameras can be mapped to different regions in the log-chrominance coordinate plane. Note that the log-chrominance coordinate plane is a Cartesian coordinate plane, with $I_u$ being the horizontal axis (i.e., the x-axis) and $I_v$ being the vertical axis (i.e., the y-axis). The single-camera color constancy problem can be seen as a regression problem to find the nonlinear mapping between the input information (e.g., the log-chrominance histogram) and the ground truth illumination. However, solving the cross-camera color constancy problem requires a large amount of labeled training data. Existing transfer-learning-based approaches require sensor calibration and tend to reduce the accuracy of the white balance for outlier image sensors (e.g., a sensor with a very different spectral sensitivity).

To solve the cross-camera color constancy problem, some embodiments of the instant camera can implement a model-agnostic meta-learning (MAML) technique to train a neural network that can learn the mapping (i.e., model parameters) between images and the illuminations using multi-domain training data (i.e., images captured by different cameras). The trained neural network can quickly adapt to new image sensors.

The MAML process can include a meta-training process, during which the meta model is trained based on a plurality of domain-specific tasks. In some embodiments of the instant application, each of the plurality of tasks can include learning the image-illumination mapping for a particular image sensor or camera. In further embodiments, the meta-training process can be performed in batches, with each batch comprising multiple randomly selected tasks (e.g., learning the image-illumination mapping for a group of randomly selected sensors). Accordingly, training samples obtained from a large number of image sensors can be organized into batches, with each batch including training data from multiple different sensors.

FIG. 1 illustrates an exemplary scenario of generating meta-learning batches from training samples of individual image sensors, according to one embodiment of the instant application. In FIG. 1, multi-domain tasks 100 can include a plurality of domain-specific tasks, such as tasks 102 and 104. Each task can be associated with a particular image sensor. For example, task 102 is associated with image sensor A, and task 104 is associated with image sensor B. More specifically, each learning task can include training a neural network to learn the image-illumination mapping based on labeled training samples obtained from the corresponding image sensor. In one embodiment, the labeled training samples can include a support set (which can be used for training the domain-specific model) and a query set (which can be used to evaluate the task performance).

Meta-training batches 110 can include a plurality of training batches, such as batches 112, 114, and 116. Each training batch can include multiple tasks randomly selected from multi-domain tasks 100. For example, batch 112 can include tasks associated with sensors A and C, batch 114 can include tasks associated with sensors E and B, and batch 116 can include tasks associated with sensors A and K. In the example shown in FIG. 1, each batch can include two tasks. In practice, each batch can include an arbitrary number of tasks. The number of total batches can depend on the training requirements.

Figure 2:
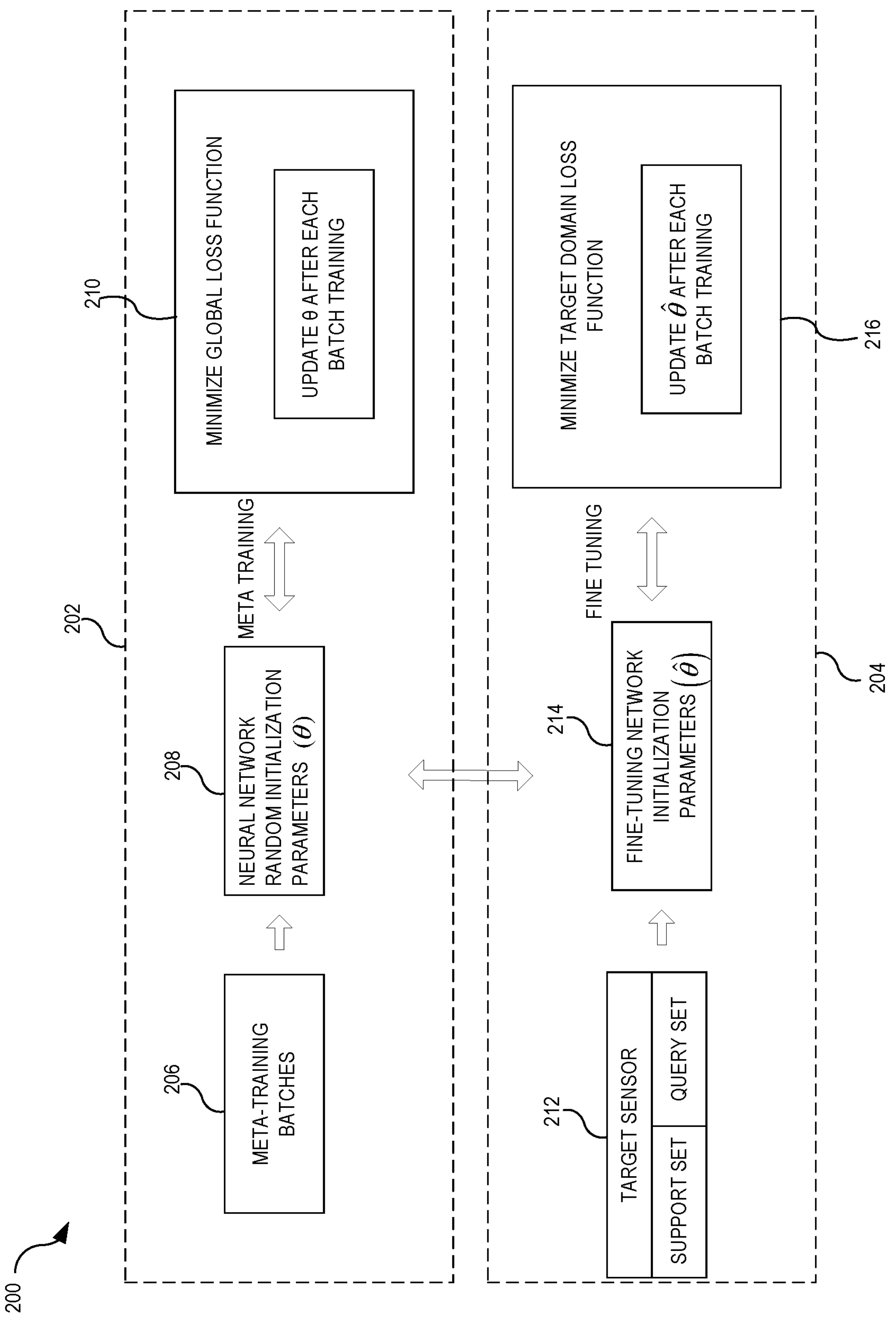
FIG. 2 illustrates an exemplary scenario for training a neural network using the model-agnostic meta-learning (MAML) technique, according to one embodiment of the instant application.

FIG. 2 illustrates an exemplary scenario for training a neural network using the model-agnostic meta-learning (MAML) technique, according to one embodiment of the instant application. As shown in FIG. 2, a model-training process 200 can include a meta-training phase 202 and a fine-tuning phase 204.

In meta-training phase 202, a plurality of meta-training batches 206 (which can be similar to meta-training batches 110 shown in FIG. 1) can be sent to a neural network 208. Neural network 208 can be represented by a function $f(\theta)$ with random initialization parameters $\theta$. The neural network can be trained (or $f(\theta)$ can be learned) by a meta-training process 210.

The goal of meta-training process 210 is to minimize a global loss function $$\left(\text{i.e., } \min_{\theta} \sum\nolimits_{T_i\_Tasks} \mathcal{L}_{T_i}\left(f_{\theta_i'}\right)\right),$$

which can be the summation of the loss function of the domain-specific tasks $T_i$. According to some embodiments, when adapting $f(\theta)$ to a new task $T_i$, the model parameters $\theta$ become $\theta_i'$, and the updated parameter vector $\theta_i'$ can be computed using one or more gradient descent updates on task $T_i$ such that $\theta'_i=\theta-\alpha\nabla\mathcal{L}_{T_i}(f_\theta)$. Note that hyperparameter $\alpha$ represents the step size for performing the update.

The loss function for each domain-specific task can represent the angular loss between the ground truth illumination $(u_{gt}, v_{gt})$ and the estimated illumination $$\mathcal{L}_{T_i}(f_\theta) = \frac{\langle illum_{gt}, illum_{est}\rangle}{\sqrt{\langle illum_{gt}, illum_{gt}\rangle\langle illum_{est}, illum_{est}\rangle}}. \quad (9)$$

Note that the model parameters $\theta$ are trained by optimizing the performance of $f_\theta$, meaning that the objective is computed using the updated model parameters:

$$\mathcal{L}_{T_i}\left(f_{\theta_i'}\right) = \frac{\langle illum_{gt}, illum_{est}\rangle}{\sqrt{\langle illum_{gt}, illum_{gt}\rangle\langle illum_{est}, illum_{est}\rangle}}. \quad (10)$$

According to some embodiments, meta-training process 210 can be performed in batches. For each task in a batch (e.g., task i in batch k), the model parameters associated with that task can be saved to predict the illumination of the training samples in the corresponding query set. The model parameters can then be updated according to the angular loss function defined in formula (9). As discussed before, the rate of the update (i.e., $\theta_i'=\theta-\alpha\nabla\mathcal{L}_{T_i}(f_\theta)$) can be adjusted by adjusting hyperparameter $\alpha$.

Within each batch, MAML aims to learn global parameters across the multiple tasks in the batch (e.g., tasks for sensors A and C in batch 112) by optimizing the model parameters $\theta$ according to the following parameter updating function:

$$\theta=\theta-\beta\nabla\sum_{T_i\square Tasks}\mathcal{L}_{T_i}(f_{\theta_i'}), \tag{11}$$

where $\beta$ is the hyperparameter used for adjusting the parameter updating step size, and Equation (10) is the angular loss of the query set of training task i.

In fine-tuning phase 204, the meta or global model (i.e., $f(\hat{\theta})$) learned in meta-training phase 202 can be fine-tuned or adapted to a new task associated with a target sensor. More specifically, in fine-tuning phase 204, labeled training data 212 (which can include a support set and a query set) associated with a target sensor can be sent to a neural network 214 with initialization parameters $\hat{\theta}$, which can be the model parameters outputted by meta-training process 210. Neural network 214 can be fine-tuned by a training process 216 to minimize a target loss function $$\left(\text{i.e., } \min_{\theta}\mathcal{L}_{\text{Target Domain}}(f_{\hat{\theta}})\right),$$

where the target loss function is:

$$\mathcal{L}_{\text{Target Domain}}(f_{\hat{\theta}})=\frac{\langle illum_{gt}, illum_{est}\rangle}{\sqrt{\langle illum_{gt}, illum_{gt}\rangle\langle illum_{est}, illum_{est}\rangle}}. \tag{12}$$

In some embodiments, training process 216 can also be performed in batches, and the parameter update in each batch can be computed using gradient descent such that $\hat{\theta}-\hat{\theta}-\alpha\nabla\mathcal{L}_{\text{Target Domain}}(f_\theta)$.

As can be seen from FIGS. 1 and 2 that the proposed color constancy solution can split the multi-domain tasks into many domain-specific tasks, with each task being a regression learning process. Meta model parameters can be learned using the MAML training process, and the meta model can be fine-tuned to adapt to a particular target sensor using training data associated with the target sensor. This technique can reduce the effort of model re-training for a new sensor.

Figure 3:
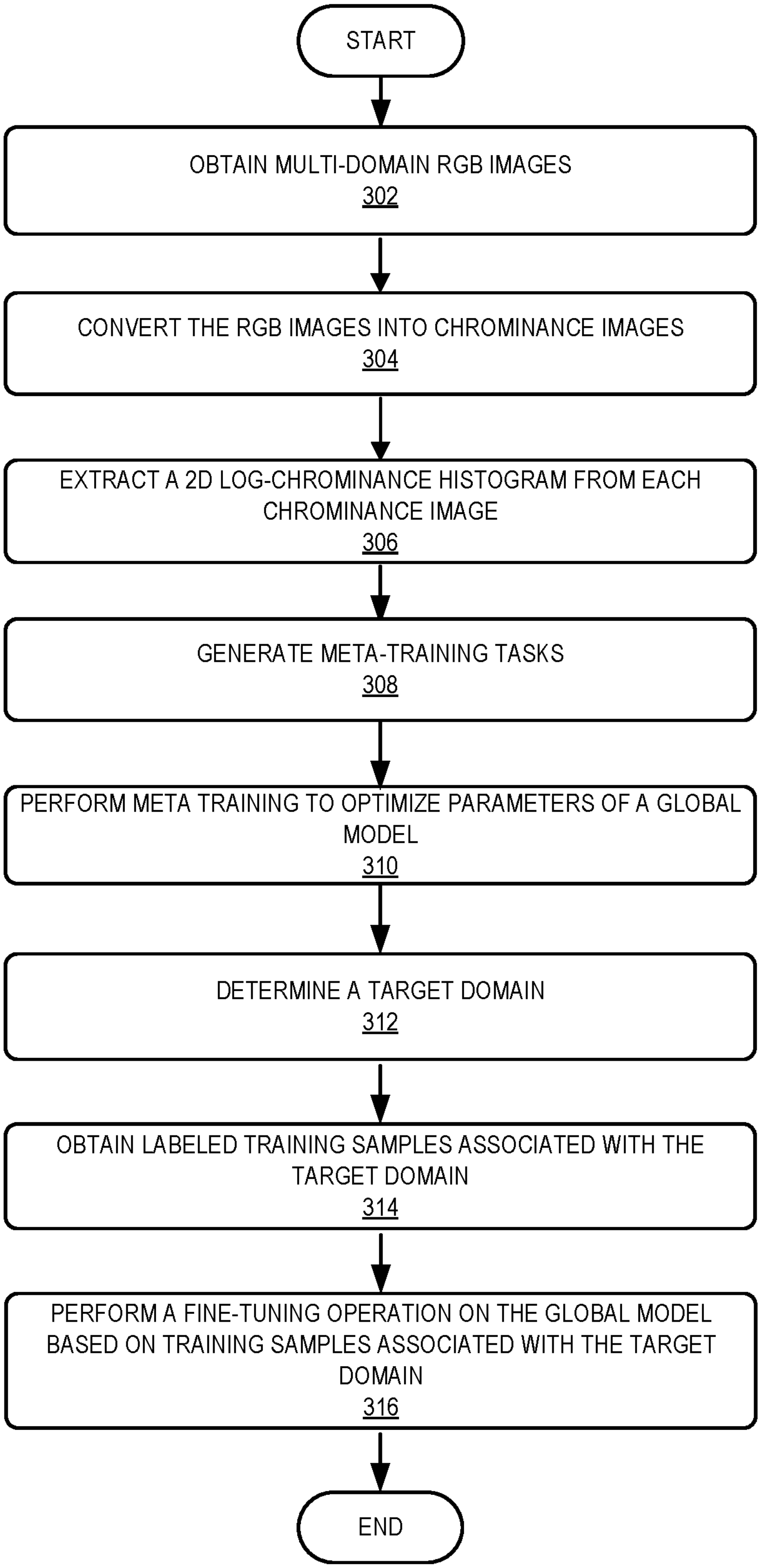
FIG. 3 presents a flowchart illustrating an exemplary model training process, according to one embodiment of the instant application.

FIG. 3 presents a flowchart illustrating an exemplary model training process, according to one embodiment of the instant application. In one or more embodiments, one or more of the steps in FIG. 3 may be repeated and/or performed in a different order. Accordingly, the specific arrangement of steps shown in FIG. 3 should not be construed as limiting the scope of the technique.

During operation, a plurality of RGB images captured by a plurality of cameras under known illumination conditions (i.e., multi-domain RGB images) can be obtained (operation 302). The known illumination conditions can also be referred to as the ground truth illuminations and can be recorded using RGB values (e.g., $L=(L_r, L_g, L_b)$). The RGB images can be converted into chrominance or u-v images (operation 304). Converting the RGB images into chrominance images can include removing the global black level. In some embodiments, the system can generate a u-v image from the RGB values of an image by computing $I_u=\log(I_g/I_r)$ and $I_v=\log(I_g/I_b)$. In alternative embodiments, generating the u-v image from the RGB values can include computing $$I_u=\log\left(\frac{I_b\cdot I_r}{2I_g}\right) \text{ and } I_v=\log\left(\frac{I_b}{I_r}\right).$$

A 2D log-chrominance histogram can then be extracted from each u-v image (operation 306). In one example, the histogram can be computed according to Equation (8). The 2D log-chrominance histogram can form the features of the image. In some embodiments, a set of labeled training samples sent to the machine learning model (e.g., a deep-learning neural network) can include the 2D log-chrominance histograms of the images labeled with corresponding ground truth illuminations. In some embodiments, the ground truth illumination can also be represented using its chrominance measures (e.g., according to Formula (5)).

The system can then generate meta-training tasks based on the multi-domain training data (operation 308). In some embodiments, the multi-domain training data (i.e., histograms of images from multiple sensors) can be grouped into different sets of training data for different individual tasks, with each task being a regression task associated with a particular image sensor. More specifically, training data for a task can include labeled histograms of images produced by the corresponding image sensor. The label can indicate the ground truth illumination. In some embodiments, the labeled training data can include a support set and a query set. The objective of the regression task can be minimizing a loss function (e.g., the angular loss between the ground truth illumination and the estimated illumination). In some embodiments, the multi-domain training data can be organized into batches, with each batch including training data for multiple (e.g., two, three, etc.) individual domain-specific tasks.

The system can then perform a meta-training process to optimize the parameters of a meta model (operation 310). In some embodiments, the meta-training process can include an inner loop that uses a gradient descent technique to update the model parameters for each individual task. For example, the model parameters for task i can be updated according to $\theta_i'=\theta-\alpha\nabla\mathcal{L}_{T_i}(f_\theta)$, where $f(\theta)$ is a model mapping the image histogram to illumination and $\alpha$ is an adjustable hyperparameter. The meta-training process can also include an outer loop that uses a gradient descent technique to update the global parameters based on a meta objective (e.g., minimizing a global loss function). In one example, parameters for the meta model can be updated according to $\theta=\theta-\beta\Sigma_{T_i\square Tasks}\nabla\mathcal{L}_{T_i}(f_{\theta_i'})$, where $\beta$ is an adjustable hyperparameter. In further embodiments, the meta-training process can be performed using a batch training technique. The batch size can be user-defined.

Subsequent to training the meta model, the system can determine a target domain (operation 312). In some embodiments, the target domain can be the image sensor of interest, such as the camera that captures the images needing to be white balanced. The target domain can be a new sensor or an existing sensor used in the collection of the multi-domain training data. Labeled training samples associated with the target domain can be obtained (operation 314). More specifically, RGB images captured by the target camera under known illumination conditions can be collected, and 2D log-chrominance histograms associated with those images can be computed. If the target domain is an existing sensor, the training samples associated with the target domain can be part of the multi-domain training data. If the target domain is a new image sensor, additional RGB images needed to be collected from the new image sensor.

The system can then perform a fine-tuning operation on the meta model (e.g., $f(\hat{\theta})$) based on the labeled training samples associated with the target domain to obtain a trained model for the target domain (operation 316). In other words, the meta model is adapted to a new task (i.e., the task of finding the mapping between the image and the illumination in the target domain). In some embodiments, parameters of the meta model can be fine-tuned to minimize a target loss function. The model parameters can be updated using a gradient descent technique according to $\hat{\theta}=\hat{\theta}-\alpha\nabla\mathcal{L}_{\text{Target Domain}}(f_{\hat{\theta}})$.

Figure 4:
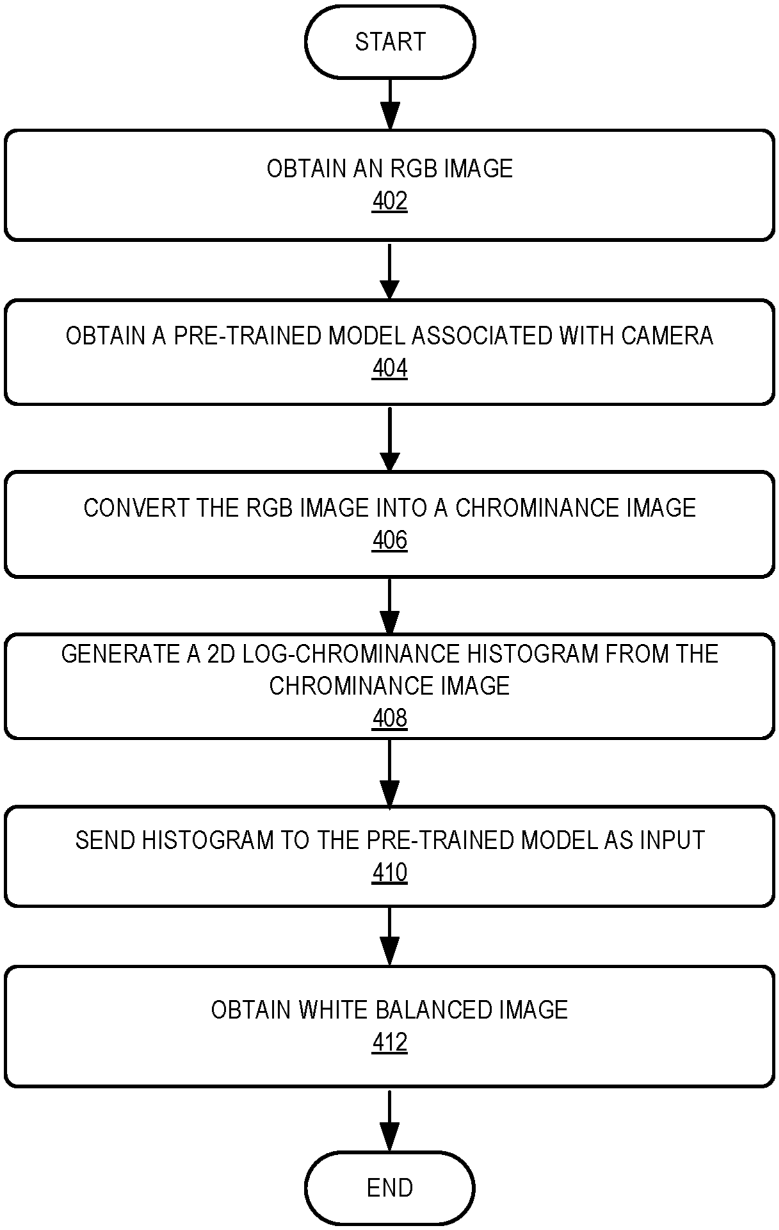
FIG. 4 presents a flowchart illustrating an exemplary white-balancing process, according to one embodiment of the instant application.

FIG. 4 presents a flowchart illustrating an exemplary white-balancing process, according to one embodiment of the instant application. During operation, a to-be-processed RGB image can be obtained (operation 402). The RGB image is captured by a particular camera, and a pre-trained machine learning model associated with that particular camera can be obtained (operation 404). According to some embodiments, the machine learning model (e.g., a deep-learning neural network) can be trained using a process similar to the one shown in FIG. 3.

The RGB image can be converted into a chrominance image (operation 406), and a 2D log-chrominance histogram can be generated based on the chrominance image (operation 408). The histogram can be sent to the pre-trained machine learning model as input (operation 410). A white balanced image corresponding to the RGB image can then be obtained (operation 412). More specifically, the machine learning model can output the estimated illumination associated with the RGB image, and the white balanced image can be generated based on W=I/L.

Figure 5:
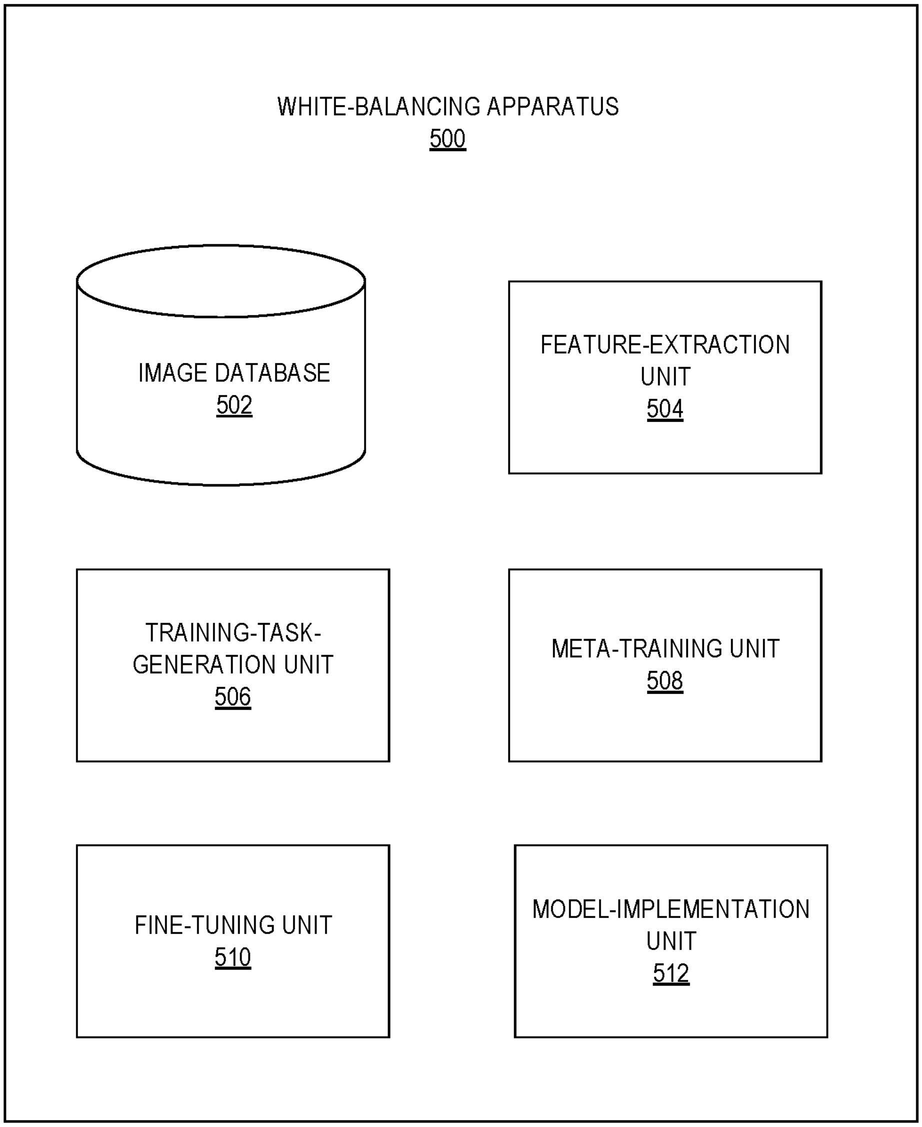
FIG. 5 illustrates an exemplary apparatus for white balancing images, according to one embodiment of the instant application.

FIG. 5 illustrates an exemplary apparatus for white balancing images, according to one embodiment of the instant application. White-balancing apparatus 500 can include an image database 502, a feature-extraction unit 504, a training-task-generation unit 506, a meta-training unit 508, a fine-tuning unit 510, and a model-implementation unit 512.

Image database 502 can store multi-domain RGB images, such as RGB images captured by a plurality of cameras under different known illumination conditions. Feature-extraction unit 504 can be responsible for extracting features useful for white balancing the RGB images. In some embodiments, image-feature-extraction unit 504 can generate, for each RGB image, a 2D log-chrominance histogram. More specifically, each RGB image can be converted into a chrominance image with the two chrominance components u and v defined based on the pixel RGB values. In one embodiment, the log-chrominance values of a pixel can be computed according to $I_u=\log(I_g/I_r)$ and $I_v=\log(I_g/I_b)$. In an alternative embodiment, the log-chrominance values of a pixel can be computed according to $$I_u = \log\left(\frac{I_b \cdot I_r}{2I_g}\right) \text{ and } I_v = \log\left(\frac{I_b}{I_r}\right).$$

Training-task-generation unit 506 can be responsible for generating domain-specific training tasks based on the multi-domain training samples. In some embodiments, training-task-generation unit 506 can split the multi-domain training samples (e.g., histograms) from different image sensors into sample sets for training individual tasks, with each task being specific to a particular image sensor. In further embodiments, training-task-generation unit 506 can generate a plurality of batches, with each batch comprising multiple (e.g., two, three, or more) individual tasks. The multiple tasks in each batch can be randomly selected from the plurality of individual training tasks. In one example, a batch can include two sets of labeled training samples, with each set corresponding to a particular image sensor. Each training set can also include a support set and a query set for meta-learning purposes.

Meta-training unit 508 can be responsible for performing the meta-training operation. In some embodiments, the meta-training operation can include training a meta model. More specifically, training the meta model can include optimizing parameters for each individual task based on a task-specific loss function and optimizing global parameters based on a global loss function. The output of the meta-training operation can be the trained meta model.

Fine-tuning unit 510 can be responsible for fine-tuning the meta model to adapt it to a target domain. Fine-tuning the meta model can include optimizing model parameters based on training samples associated with the target domain. Model-implementation unit 512 can be responsible for white balancing images from a particular image sensor based on a fine-tuned model associated with the particular image sensor. Compared with the conventional single-task learning process, the proposed multi-task learning (e.g., MAML) technique can provide fast learning and reduce the number of training samples needed.

Figure 6:
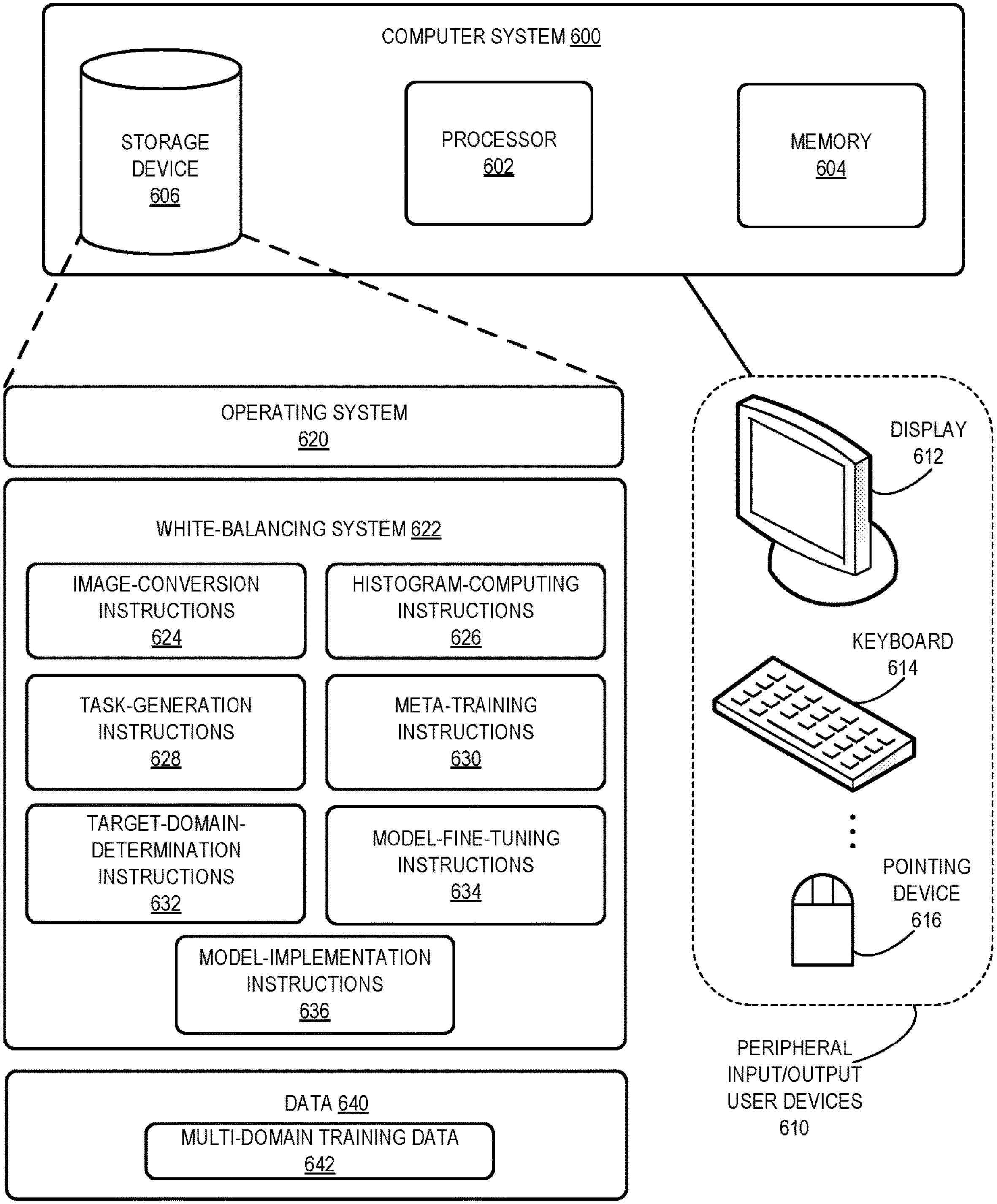
FIG. 6 illustrates an exemplary computer system that facilitates the white balancing of images, according to one embodiment of the instant application.

FIG. 6 illustrates an exemplary computer system that facilitates the white balancing of images, according to one embodiment of the instant application. Computer system 600 includes a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 620, a white-balancing system 622, and data 640.

White-balancing system 622 can include instructions, which when executed by computer system 600, can cause computer system 600 or processor 602 to perform methods and/or processes described in this disclosure. Specifically, white-balancing system 622 can include instructions for converting sample RGB images into chrominance images (image-conversion instructions 624), instructions for computing 2D log-chrominance histograms of sample images (histogram-computing instructions 626), instructions for generating training tasks (task-generation instructions 628), instructions for performing meta-training to obtain a meta model (meta-training instructions 630), instructions for determining a target image sensor domain (target-domain-determination instructions 632), instructions for performing fine-tuning to adapt the meta model to the target image sensor domain (model-fine-tuning instructions 634), and instructions for implementing the fine-tuned model to perform white balancing on images in the target domain (model-implementation instructions 636). Data 640 can include labeled multi-domain training data 642.

This disclosure presents various techniques to efficiently train a machine learning model (e.g., a deep learning neural network) to achieve cross-camera color constancy. More specifically, provided with labeled multi-domain training data (e.g., RGB images captured by different cameras), the system can apply the MAML technique to train a meta model. Each training instance can be an individual training task specific to an image sensor, and the training output can be the meta model. The training of the meta model can be performed in batches, with each batch comprising multiple training tasks associated with randomly selected image sensors. Each training task can involve updating model parameters based on a domain-specific loss function, whereas parameters of the meta model can be optimized based on a global loss function. The meta model can be adapted to any new domain (i.e., image sensor) by fine-tuning the model parameters using training data in the new domain. The fine-tuning or adaption of the meta model is much faster and requires fewer training samples than conventional approaches that train different models for different cameras.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices, solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the optimized parameters from the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A computer-implemented method for white balancing images, the method comprising:

obtaining labeled red, green, and blue (RGB) image samples captured by a plurality of cameras;

generating a plurality of training tasks, wherein a respective training task is associated with RGB image samples captured by a corresponding camera, wherein the respective training task comprises a regression task based on a camera-specific loss function, wherein each RGB image sample is labeled with ground truth illumination, and wherein the camera-specific loss function measures angular loss between the ground truth illumination and estimated illumination;

performing meta-training over the plurality of training tasks to obtain a meta model, wherein parameters of the meta model are optimized based on a global loss function;

obtaining an image captured by a first camera;

fine-tuning the meta model using labeled RGB image samples captured by the first camera to obtain a fine-tuned model specific to the first camera; and implementing the fine-tuned model to white balance the image.

2. The computer-implemented method of claim 1, further comprising extracting features from each RGB image sample by computing a two-dimensional (2D) log-chrominance histogram.

3. The computer-implemented method of claim 2, wherein computing the 2D log-chrominance histogram comprises computing chrominance components of each pixel in the RGB image sample based on RGB values of the pixel.

4. The computer-implemented method of claim 1, wherein the first camera comprises a new camera not included in the plurality of cameras.

5. The computer-implemented method of claim 1, wherein performing the meta-training comprises batch training, and wherein a respective batch comprises multiple randomly selected training tasks.

6. A non-transitory computer readable storage medium storing instructions which, when executed by a processor, causes the processor to perform a method for white balancing images, the method comprising:

obtaining labeled red, green, and blue (RGB) image samples captured by a plurality of cameras;

generating a plurality of training tasks, wherein a respective training task is associated with RGB image samples captured by a corresponding camera, wherein the respective training task comprises a regression task based on a camera-specific loss function, wherein each RGB image sample is labeled with ground truth illumination, and wherein the camera-specific loss function measures angular loss between the ground truth illumination and estimated illumination;

performing meta-training over the plurality of training tasks to obtain a meta model, wherein parameters of the meta model are optimized based on a global loss function;

obtaining an image captured by a first camera;

fine-tuning the meta model using labeled RGB image samples captured by the first camera to obtain a fine-tuned model specific to the first camera; and implementing the fine-tuned model to white balance the image.

7. The non-transitory computer readable storage medium of claim 6, wherein the method further comprises extracting features from each RGB image sample by computing a two-dimensional (2D) log-chrominance histogram.

8. The non-transitory computer readable storage medium of claim 7, wherein computing the 2D log-chrominance histogram comprises computing chrominance components of each pixel in the RGB image sample based on RGB values of the pixel.

9. The non-transitory computer readable storage medium of claim 6, wherein the first camera comprises a new camera not included in the plurality of cameras.

10. The non-transitory computer readable storage medium of claim 6, wherein performing the meta-training comprises batch training, and wherein a respective batch comprises multiple randomly selected training tasks.

11. A computer system, comprising:

a processor; and a storage device coupled to the processor, wherein the storage device storing instructions which, when executed by the processor, cause the processor to perform a method for white balancing images, the method comprising:

obtaining labeled red, green, and blue (RGB) image samples captured by a plurality of cameras;

generating a plurality of training tasks, wherein a respective training task is associated with RGB image samples captured by a corresponding camera, wherein the respective training task comprises a regression task based on a camera-specific loss function, wherein each RGB image sample is labeled with ground truth illumination, and wherein the camera-specific loss function measures angular loss between the ground truth illumination and estimated illumination;

performing meta-training over the plurality of training tasks to obtain a meta model, wherein parameters of the meta model are optimized based on a global loss function;

obtaining an image captured by a first camera;

fine-tuning the meta model using labeled RGB image samples captured by the first camera to obtain a fine-tuned model specific to the first camera; and implementing the fine-tuned model to white balance the image.

12. The computer system of claim 11, wherein the method further comprises extracting features from each RGB image sample by computing a two-dimensional (2D) log-chrominance histogram.

13. The computer system of claim 12, wherein computing the 2D log-chrominance histogram comprises computing chrominance components of each pixel in the RGB image sample based on RGB values of the pixel.

14. The computer system of claim 11, wherein performing the meta-training comprises batch training, and wherein a respective batch comprises multiple randomly selected training tasks.

* * * * *